(12) United States Patent
Nightser et al.

(10) Patent No.: US 11,012,331 B1
(45) Date of Patent: May 18, 2021

(54) NETWORK MONITORING TO PERFORM FAULT ISOLATION

(71) Applicant: West Corporation, Omaha, NE (US)

(72) Inventors: Adam Nightser, Omaha, NE (US); Tariq Khan, Omaha, NE (US)

(73) Assignee: West Corporation, Omaha, NE (US)

( * ) Notice: Subject to any disclaimer, the term of this patent is extended or adjusted under 35 U.S.C. 154(b) by 204 days.

(21) Appl. No.: 15/842,344

(22) Filed: Dec. 14, 2017

(51) Int. Cl.
*H04L 12/24* (2006.01)
*H04L 12/26* (2006.01)

(52) U.S. Cl.
CPC ...... *H04L 43/0817* (2013.01); *H04L 41/0659* (2013.01); *H04L 41/0677* (2013.01); *H04L 43/10* (2013.01); *H04L 43/50* (2013.01); *H04L 41/0645* (2013.01)

(58) Field of Classification Search
CPC . H04L 43/0817; H04L 41/0677; H04L 43/50; H04L 41/0659; H04L 43/10; H04L 41/0645
USPC .......................................................... 709/224
See application file for complete search history.

(56) References Cited

U.S. PATENT DOCUMENTS

| | | | |
|---|---|---|---|
| 6,480,469 B1 * | 11/2002 | Moore ....................... | H04L 1/24 370/241 |
| 6,823,479 B1 * | 11/2004 | McElhaney, Jr. ....... | H04L 43/50 714/4.2 |
| 6,892,328 B2 * | 5/2005 | Klein ..................... | G11C 29/56 714/27 |
| 8,194,639 B2 * | 6/2012 | Wu ......................... | H04L 12/18 370/351 |
| 9,066,275 B2 * | 6/2015 | Yan ........................ | H04W 48/02 |
| 9,071,989 B2 * | 6/2015 | Capers ................... | H04W 24/06 |
| 9,547,570 B2 * | 1/2017 | Chu ........................ | G06F 11/263 |
| 10,047,975 B2 * | 8/2018 | Kwemo ................... | F24T 10/15 |
| 10,263,869 B1 * | 4/2019 | Dzierwinski ............ | H04L 43/50 |
| 10,673,725 B2 * | 6/2020 | Nambisan ......... | H04L 29/06095 |
| 2004/0098230 A1 * | 5/2004 | Richard .................. | H04L 41/00 702/186 |
| 2015/0019713 A1 * | 1/2015 | Bugenhagen ........... | H04L 43/10 709/224 |
| 2017/0153870 A1 * | 6/2017 | Wu ....................... | H04L 41/5009 |
| 2017/0317903 A1 * | 11/2017 | Balwani .............. | H04L 12/5692 |
| 2017/0366437 A1 * | 12/2017 | Bonica ................ | H04L 43/0817 |
| 2018/0287912 A1 * | 10/2018 | Zabarsky .............. | G06F 3/0611 |
| 2018/0338278 A1 * | 11/2018 | Ketonen ............... | H04W 48/16 |

* cited by examiner

*Primary Examiner* — Moustafa M Meky
*Assistant Examiner* — Elizabeth Kassa (57) ABSTRACT

Network site testing of other sites in a communication network environment may be performed with the assistance of all sites participating to identify and confirm failures. One example method of operation may include transmitting a test message from a test site to a network site, the test message solicits a feedback response from the network site, determining whether a feedback response message was received from the network site, and determining whether the network site is in an up state or a down state based on the feedback response message being received or not being received. Other sites and triangulation may be used to confirm a sub-network status.

17 Claims, 7 Drawing Sheets

NETWORK MONITORING TO PERFORM FAULT ISOLATION

TECHNICAL FIELD OF THE APPLICATION

This application relates to network monitoring and more particularly to fault isolation via automated monitoring and corrective measures.

BACKGROUND OF THE APPLICATION

Conventionally, as networks grow to include additional sub-networks, devices, and/or switches/routers, the likelihood of bottlenecks, traffic congestion, and failures continually increases. Most monitoring applications are manual and do not take proactive measures to continually monitor and mend network failures. For example, a server may have a diagnostic tool managed by an administrator to manually identify computers on the network to determine if their diagnostics (i.e., packet rate, CPU usage, memory usage, etc.) are optimal when compared to other devices. However, once the diagnostic tool monitors network devices and/or traffic for 24 hours or however long it was commissioned to perform such actions, the tool normally stops monitoring and does not offer any additional information or actions necessary to correct failures and other network anomalies.

SUMMARY OF THE APPLICATION

Example embodiments of the present application provide at least a method that includes at least one of monitoring a plurality of network devices via a diagnostic application operating on a server, transmitting a plurality of messages to the plurality of network devices, wherein the plurality of messages solicit feedback responses from the plurality of network devices, receiving feedback responses from at least a portion of the plurality of network devices, and determining at least one of the plurality of network devices is operating under an acceptable performance threshold based on the feedback responses received.

Another example embodiment method may include at least one of transmitting a test message from a test site to a network site, the test message solicits a feedback response from the network site, determining whether a feedback response message was received from the network site, and determining whether the network site is in an up state or a down state based on the feedback response message being received or not being received.

Still another example embodiment may include an apparatus that includes a transmitter configured to transmit a test message from a test site to a network site, wherein the test message solicits a feedback response from the network site, a processor configured to determine whether a feedback response message was received from the network site, and determine whether the network site is in an up state or a down state based on the feedback response message being received or not being received.

Yet another example embodiment may include a non-transitory computer readable storage medium configured to store instructions that when executed cause a processor to perform at least one of transmitting a test message from a test site to a network site, wherein the test message solicits a feedback response from the network site, determining whether a feedback response message was received from the network site, and determining whether the network site is in an up state or a down state based on the feedback response message being received or not being received.

In one specific example, a large network with various different consolidated sub-networks may experience increases in the number of failures, network traffic spikes, and router/switch failures due to overly large queues of traffic which eventually timeout and are dropped. Alarms and other known tools may be limited since the alarms may sound quickly and in succession which offers no guidance as to the root cause or the initial/main failure portion of the network. Mapping the failures and storing the data, such as when and where the problems occur could provide a baseline to compare with other portions of the network which are working optimally in an effort to correct such failures.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

According to one example embodiment, a monitoring tool may be installed on a server to provide diagnostic information, such as CPU usage, memory usage, disk space usage, packet rate, packet drop rate, throughput, jitter, latency, etc., regarding the performance of any network devices in communication with the server. For example purposes, the monitoring application may monitor certain traffic measurements for routers, switches and other network nodes. In one example, a session initiation protocol (SIP) standard type of messaging may be used operate a SIP stack, such as a SIP messaging platform to send and receive SIP OPTIONS or keep-alive messages to such network nodes and identify a success or failure status for any one particular node and/or corresponding sub-network associated with the various network nodes being monitored.

Figure 1:
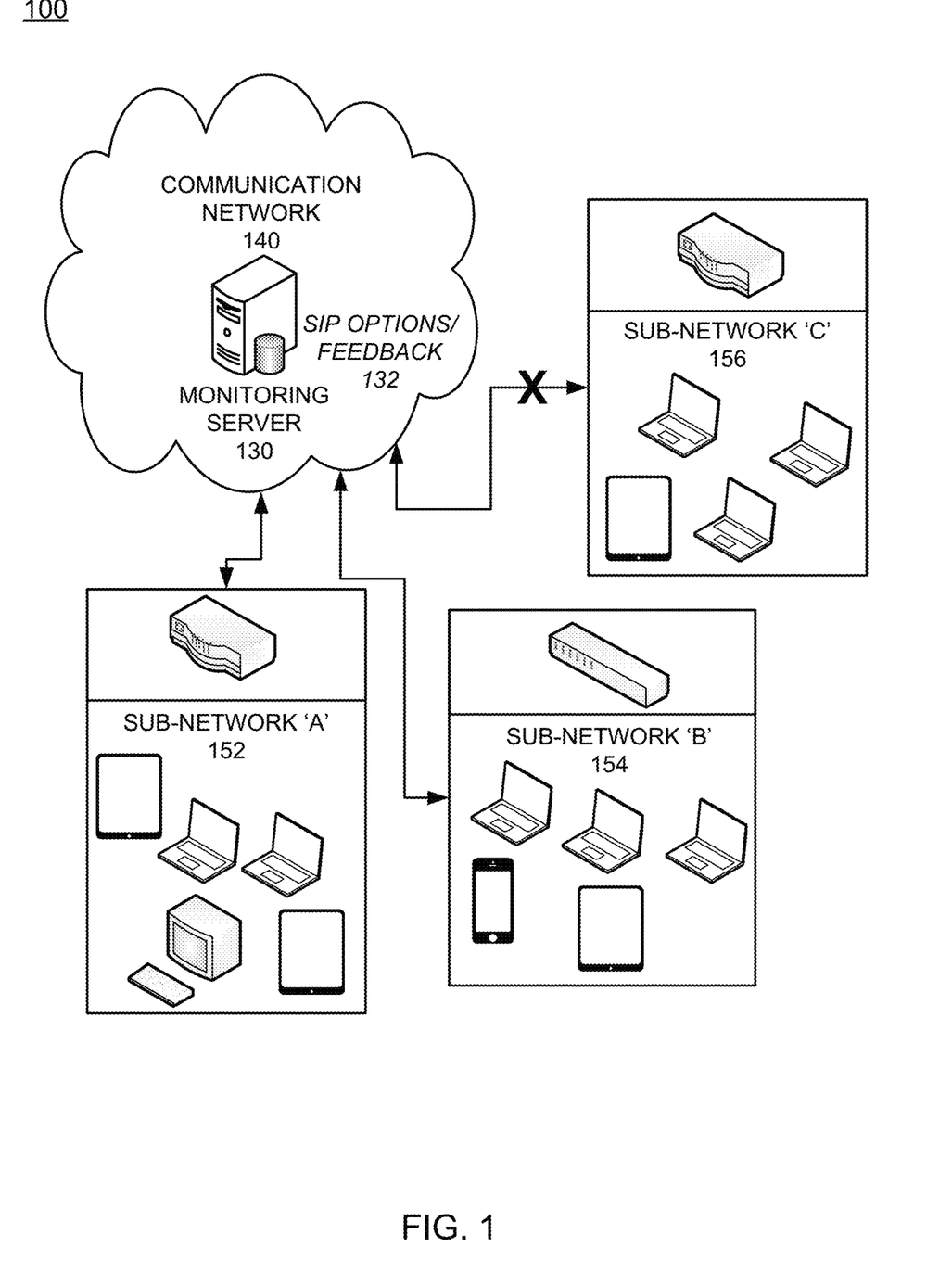
FIG. 1 illustrates an example network configuration for monitoring and isolating network faults over various sub-networks according to example embodiments.

FIG. 1 illustrates an example network configuration for monitoring and isolating network faults over various sub-networks according to example embodiments. Referring to FIG. 1, the network 100 includes a communication network 140, such as a cloud or optimized computing environment which includes a monitoring server 130 configured as a stand-alone, distributed and/or virtual machine computing server configured to communicate with various sub-network segments (A-C) by requesting ongoing communication status updates. For example, the monitoring server 130 may submit SIP OPTIONS messages 132 in an attempt to solicit feedback and calculate network metrics, such as data rate statistics, which can then be used to calculate metrics and/or perform a fault isolation analysis on which sub-networks are experiencing latency, network failures, dropped packets, etc.

Continuing with the same example, as the response information is received from the routers and/or switches identified at particular network sub-networks, such as 152, 154 and 156, which host various computer nodes, the monitoring application operating on the server 130 may begin to create a baseline of statistics for the sub-networks, to isolate network faults and other anomalies which can lead to network inefficiencies. Also, as the potential faults are isolated, the course of action may be automatically determined, such as reduce network load, reallocate nodes to other sub-networks, increase bandwidth and/or other resources, etc.

In operation, the messaging and feedback monitored by the monitoring server 130 may identify a particular network sub-network as dropping packets. For example, sub-network 'C' 156 may be identified as dropping packets, since its router may have failed to respond to a set number of SIP OPTIONS messages. An aggregate of failed or successful SIP messages may be statistically analyzed to count the number of failures over a period of time prior to taking action to correct such errors. A triangulation of faults may be determined based on data from neighboring routers or switches as well to further assist with the fault isolation effort.

In one example embodiment, the server may transmit Internet control message protocol (ICMP) echo ping messages, which are sent to the various end devices corresponding to the network sub-network switches and routers. Also, SIP OPTIONS messages may also be sent. The session initiation protocol (SIP) uses its own OPTIONS message that can be used not only to communicate between devices but also as a status checker. For example, the SIP messages may require a response within 3 seconds.

A sub-network 152, 154 and/or 156 is considered 'dead' (failed or unreachable) if none of its hosts respond to one ICMP echo sourced from each of three different sites/triangulation points. For example, any of the sub-networks may attempt to communicate with any other of the sub-networks via a ICMP echo message sent from the server, the router(s) and/or other network switches. When none of the sub-network routers can communicate with a particular segment, the lack of feedback response messages from that sub-network may deem the sub-network 'unavailable'. In another example, a 'Big Brother' monitoring SIP OPTIONS module (monitoring module) of the server or the routers may send a SIP OPTIONS message every so often (i.e., 10 minutes) to all sub-network routers. A timeout time frame may be designated, such as two seconds to receive the SIP reply. If a timeout does occur, then the monitoring module may attempt one more time. If the second SIP OPTION message transfer also fails to solicit a response, then an alert is raised. Messages are sent from the monitoring module to every host entity, including network routers and gateways having communication with one or more SIP servers.

The ICMP echo and SIP OPTION messages between sites A, B, C, etc., may be quantified and measured over time to provide a statistical analysis. In one example, the predetermined interval for sending such messages or a combination thereof, may be set to 10 minutes and the expected response time (i.e., timeout interval) may be set as well (i.e., 2 seconds). The responses from each identified sub-network may be stored in a productivity log or file and used to demonstrate failures/successes over a monitoring period (i.e., 7 days). This enables a list of failures to be identified, so one or more false positives can be eliminated while recurring failures can be intercepted and upgrades/correction measures can be made prior to a complete failure of an entire sub-network. For instance, over the monitoring period, the only corrective action may be to identify a threshold number of failures (non-response events) and when a certain threshold, such as three or more non-responses occur in a single 7 day period, then the sub-network may require a modification to avoid imminent failure.

Identifying network failures via triangulation may be performed by designating a sub-network as failed when there is no response to any of three triangulation points on the network. Alternatively, if one of three sites of a triangulation point is operating, then the entire sub-network may be considered active.

In one example, sub-network or 'site' A is considered active or up if all of its constituent applications and subnets are responding to all three triangulation points and site A responds to an ICMP echo from site B and site C. In another example, site A is considered inactive if none of its constituent applications and subnets are responding to all three triangulation points. Another example still is site A does not respond to an ICMP echo from site B and site C.

Figure 2A:
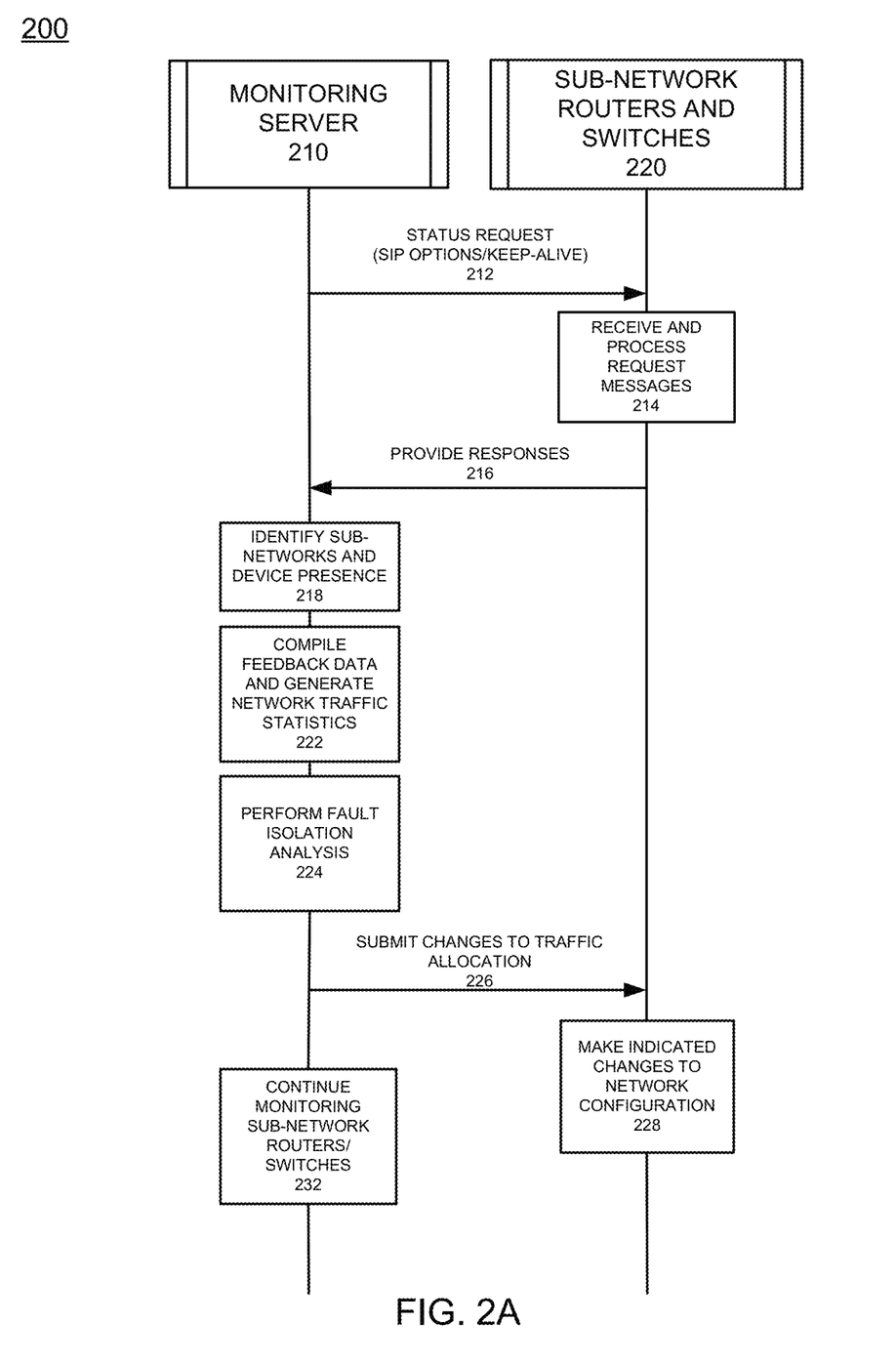
FIG. 2A illustrates an example system signaling communication example of monitoring sub-network activity and providing corrective measures according to example embodiments.

FIG. 2A illustrates an example system signaling communication example of monitoring sub-network activity and providing corrective measures according to example embodiments. Referring to FIG. 2A, the system 200 includes a monitoring server 210 communicating with one or more sub-network representative devices, such as routers and switches 220, which represent portals to a group of network end user devices. Referring to FIG. 2A, the monitoring server may initiate a monitor function by transmitting a status request message, such as a SIP OPTIONS message or a keep-alive type 212 of feedback required message. The messages will be received at the active devices and processed accordingly 214. The responses are then forwarded 216 from those sub-network devices which are active. The results are received and compiled by a database 218, spreadsheet or other data organizational tool to identify null fields, or empty sets due to a lack of responses or a timeout or a late response. The network statistics can then be generated 222 based on a timeline of event tests reflecting multiple rounds of message responses or a single round depending on the configuration. Fault isolation may be determined 224 and performed based on the results. The changes are submitted to a traffic allocation tool 226 which may operate as a software based module in one or more of the sub-network representative devices. The traffic allocation tools may make indicated changes to a current network configuration 228 in an attempt to correct identified traffic problems. The monitoring may then continue 232 to identify additional problems on the network.

Figure 2B:
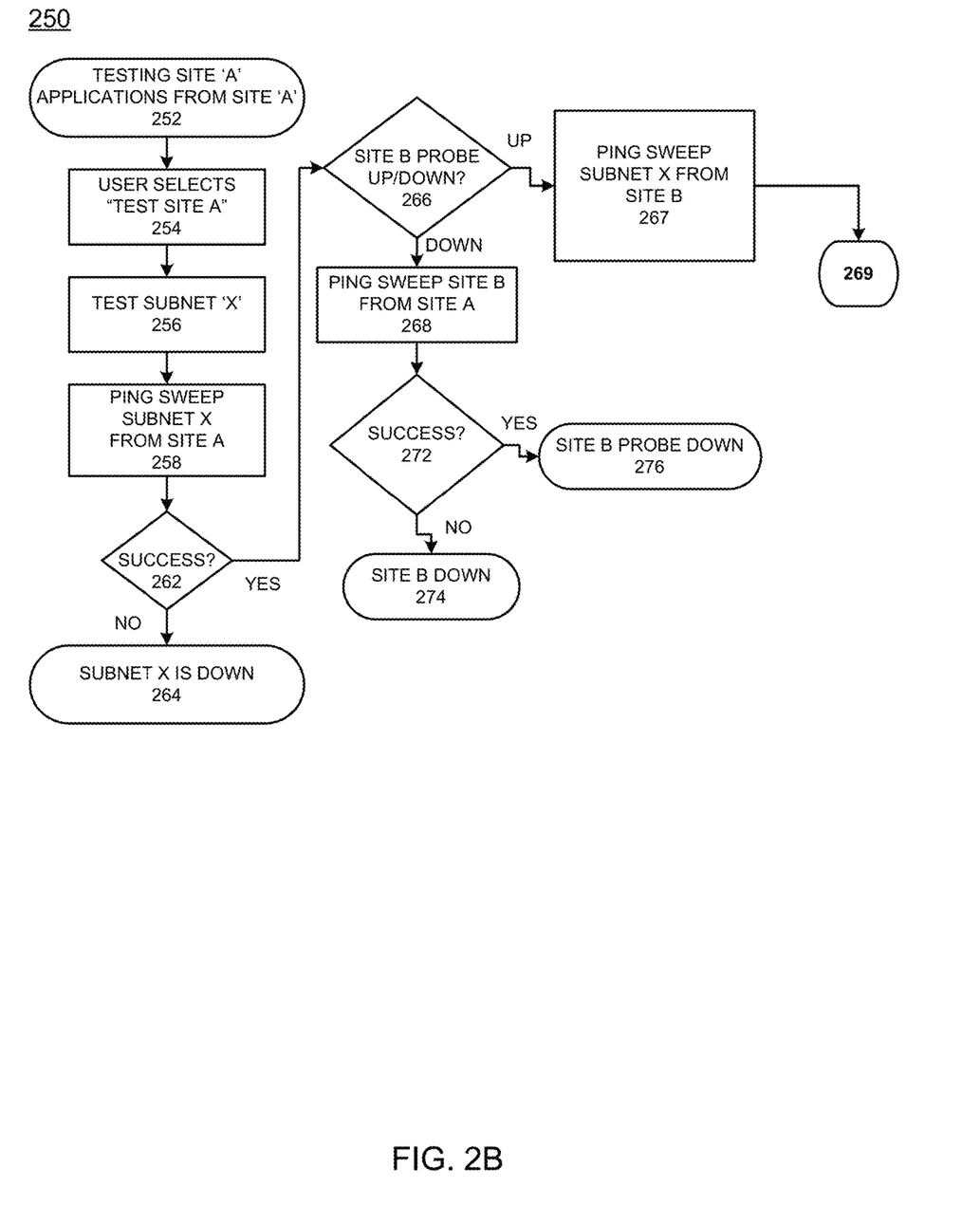
FIG. 2B illustrates a first part of an example flow diagram of an example fault isolation procedure according to example embodiments.

FIG. 2B illustrates a first part of an example flow diagram 250 of an example fault isolation procedure according to example embodiments. Referring to FIG. 2B, a fault isolation and correlation logic process begins with initiating a "Testing Site A—Applications from Site A" option 252 and then the software uses this logic engine recursively on the backend to generate data that populates a display with colorized messages for a user interface. The user may select a first site "A" 254, and test a subnetwork "X" 256 by performing a ping sweep for that subnet X from site A 258. The determination of success 262 will provide affirmation that the site is down 264 or up. The test continues with a site B test 266 including a ping sweep 268 that yields a success test 272 to determine if site B is down 274 or probe down 276. If the site B is up, a ping sweep of subnet X is performed from site B 267, which continues with operation 269 in FIG. 2C.

Figure 2C:
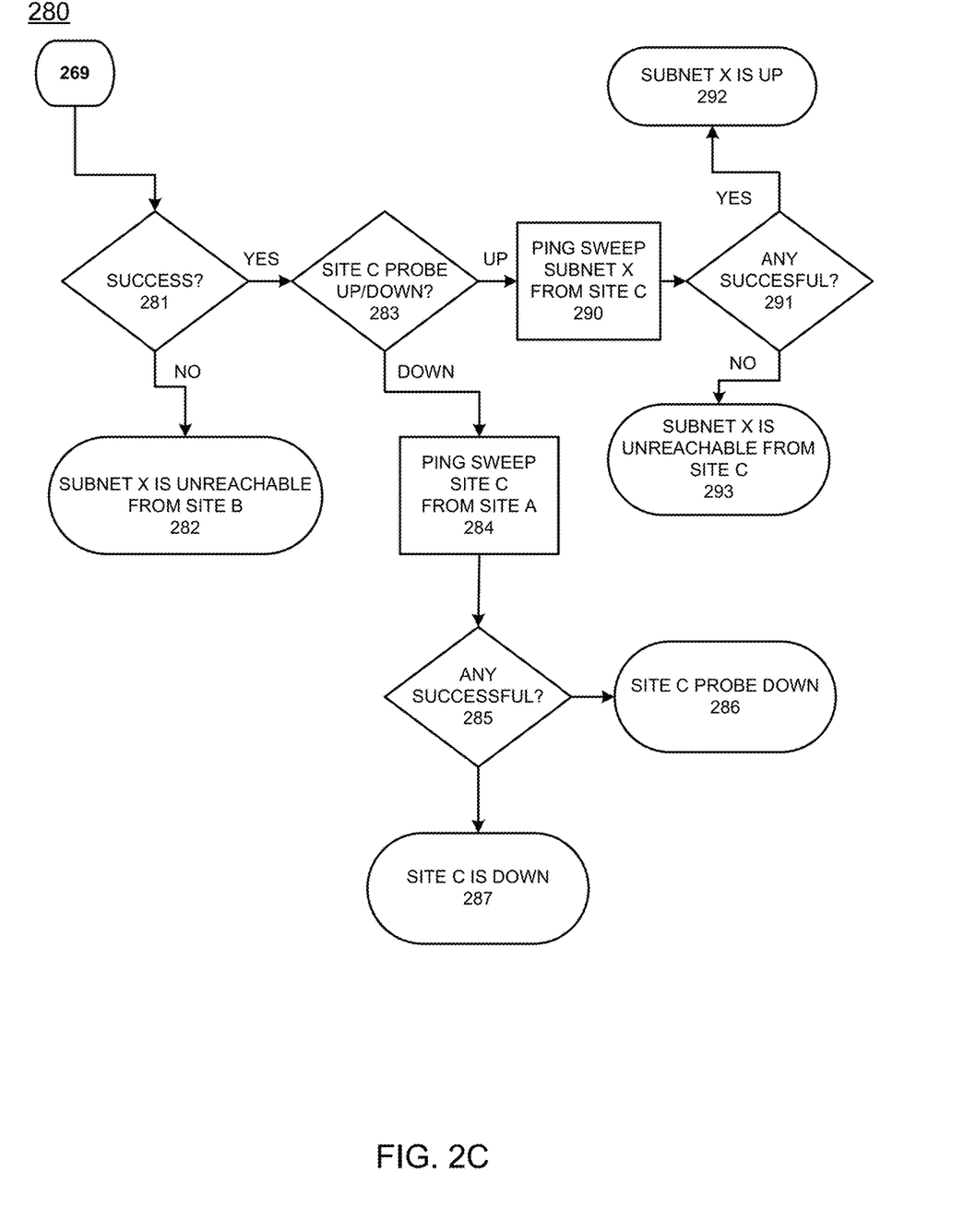
FIG. 2C illustrates a second part of an example flow diagram of an example fault isolation procedure according to example embodiments.

FIG. 2C illustrates a second part of an example flow diagram of an example fault isolation procedure according to example embodiments. Referring to FIG. 2C, the flow diagram 280 includes a continuation with a success determination 281 from site B, the subnet X being test may be unreachable from site B 282 due to lack of a response message. The site C probe may be up/down 283, and if down, a ping sweep of site C can be performed from another site, such as site A 284, a success determination 285 may yield site C being down 287 or the probe down 286. The site C may be up, in which case the ping sweep subnet X from site C 290 may determine if any of the attempts are successful 291, if so the site is deemed up 292, if not, the subnet X is deemed unreachable from site C 293. Subnet X may be any subnet separate from the site that is testing that subnet X. However, subnet X could be any of the sites being tested.

According to one example embodiment, a method may provide transmitting a test message from a test site to a network site, and where the test message solicits a feedback response from the network site. The method may also include determining whether a feedback response message was received from the network site, and determining whether the network site is in an up state or a down state based on the feedback response message being received or not being received. This may be a first operation test in a triangulation approach to having all active network sites be test sites and each of which are first tested by the last site, such as A testing sub-network X and then testing site B and then if optimal, having site B test sub-network X and then so on with site C being tested by B and then having site C test for sub-network X. The test message may be a ping sweep message, a SIP OPTIONS message, an ICMP message, etc.

The method may also include transmitting another test message from the test site to another test site, and determining whether the another test site is in an up state or a down state based on another feedback response message being received or not being received, and when the another test site is in an up state, transmitting a new test message from the another test site to the network site. The method may also include receiving no new response feedback message from the network site at the another test site, and determining the network site is in a down state. Or, instead, receiving a new response feedback message from the network site at the another test site, and determining the network site is in an up state. The method may also include designating the network site is in an up state when only one of the test site or the another test site receives any type of response feedback message from the network site.

Figure 3:
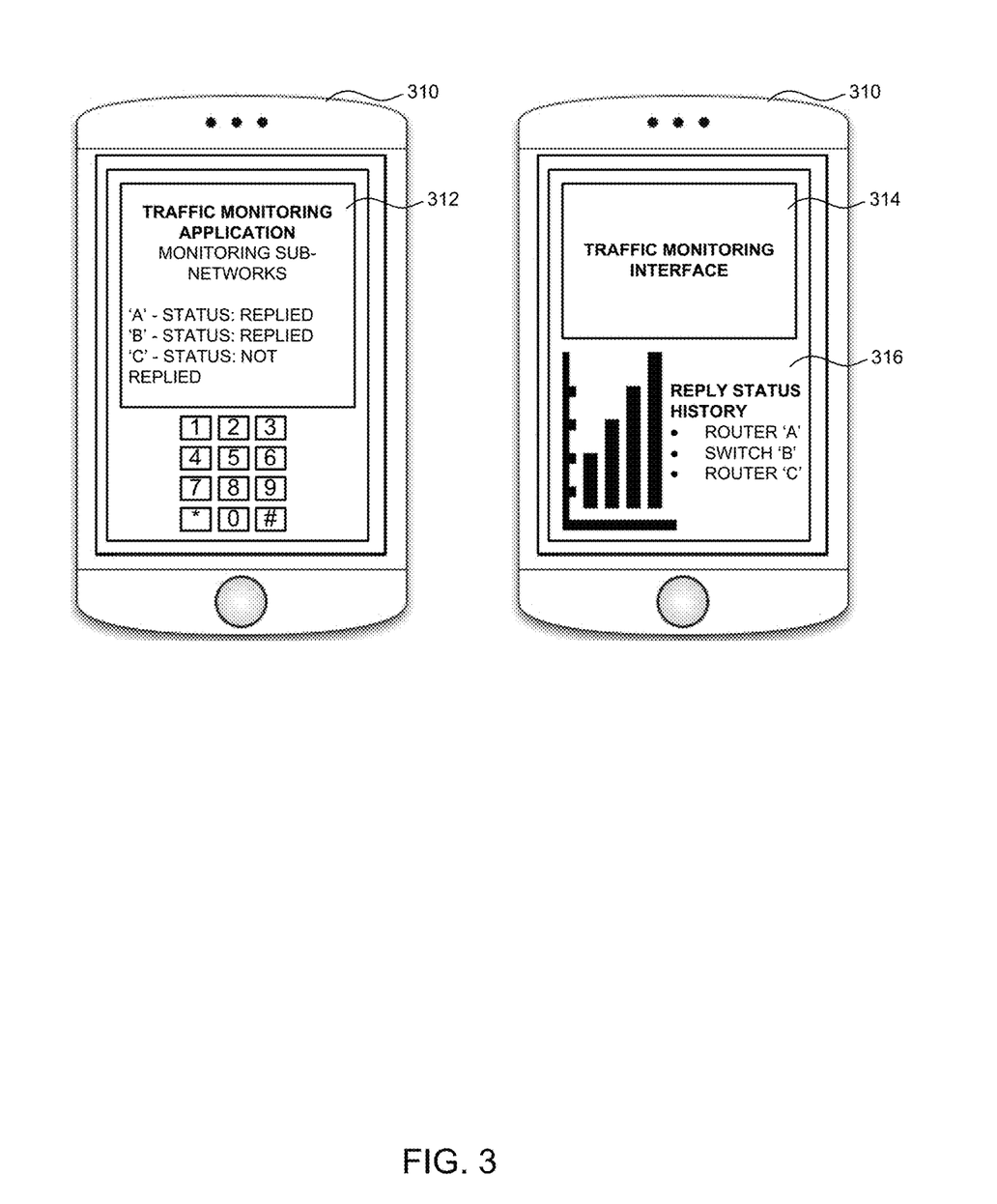
FIG. 3 illustrates a graphical user interface of a user device receiving monitored network traffic information according to example embodiments.

FIG. 3 illustrates a graphical user interface of a user device receiving monitored network traffic information according to example embodiments. Referring to FIG. 3, the user interfaces 300 may be populated with site response message data. The device 310 may first provide a populated interface 312 with a traffic monitoring tally of response statuses. The second example includes an interface 314 and a statistical analysis example 316 of success rates and other statistics which may be helpful to the network administrator or an automated action tool depending on the threshold requirements for action.

Figure 4:
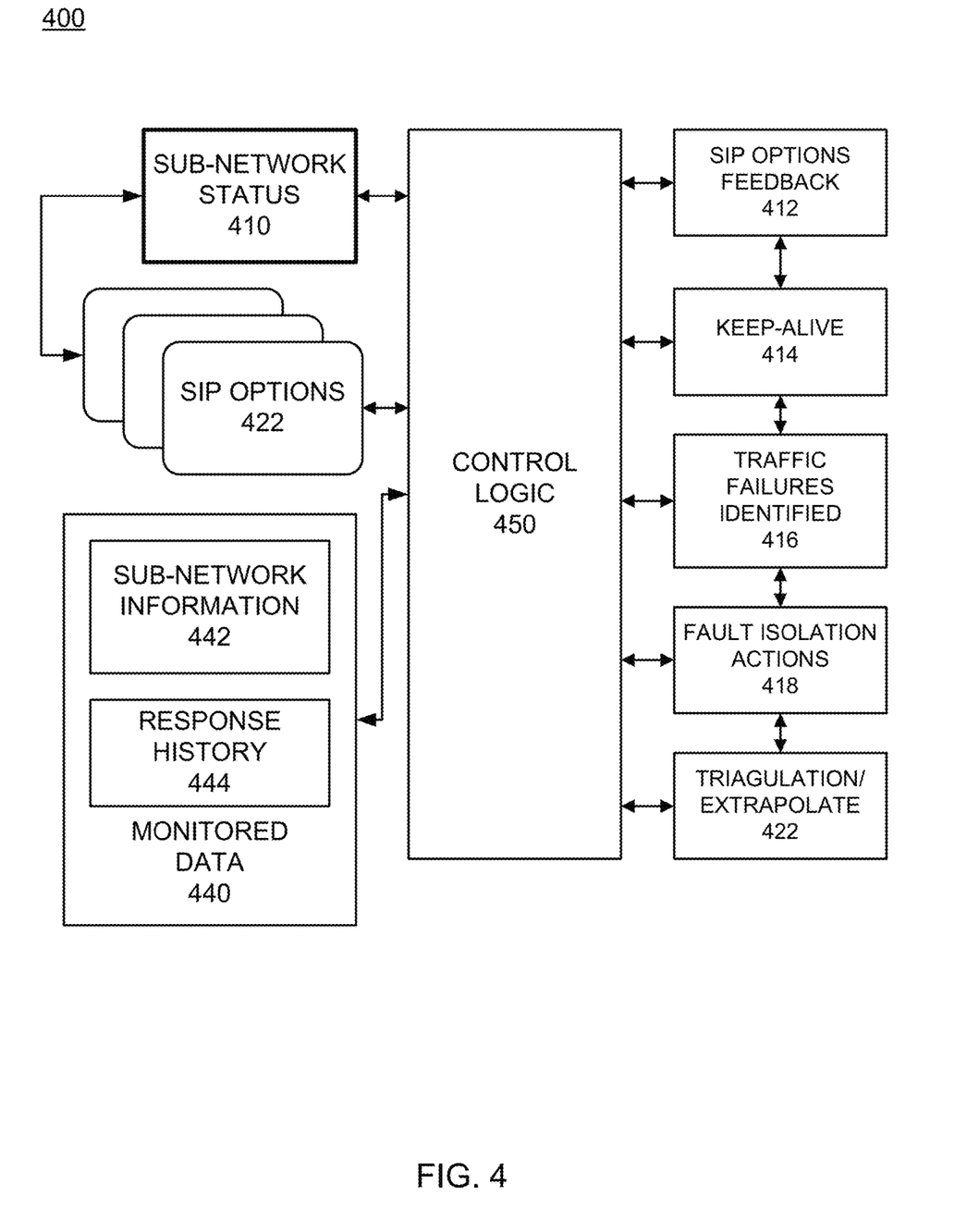
FIG. 4 illustrates a logic diagram for processing network feedback messages according to example embodiments of the present application.

FIG. 4 illustrates a logic diagram for processing network feedback messages according to example embodiments of the present application. Referring to FIG. 4, the logic model 400 includes various logic inputs, such as sub-network status information 410, SIP OPTIONS messages and other ping type messages along with stored sub-network status information 442 along with response history 444. The monitored data 440 may be stored in the main monitoring server or the various network representative devices. The control logic may be processor having software logic for the network status information compilation. The output of the logic may be SIP OPTIONS messages 412, keep alive messages 414, traffic failure events 416, fault isolation actions 418 and/or triangulation/extrapolation results 422 from various network sites each performing testing on a common site/subnetwork location.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example network element 500, which may represent any of the above-described network components of the other figures.

Figure 5:
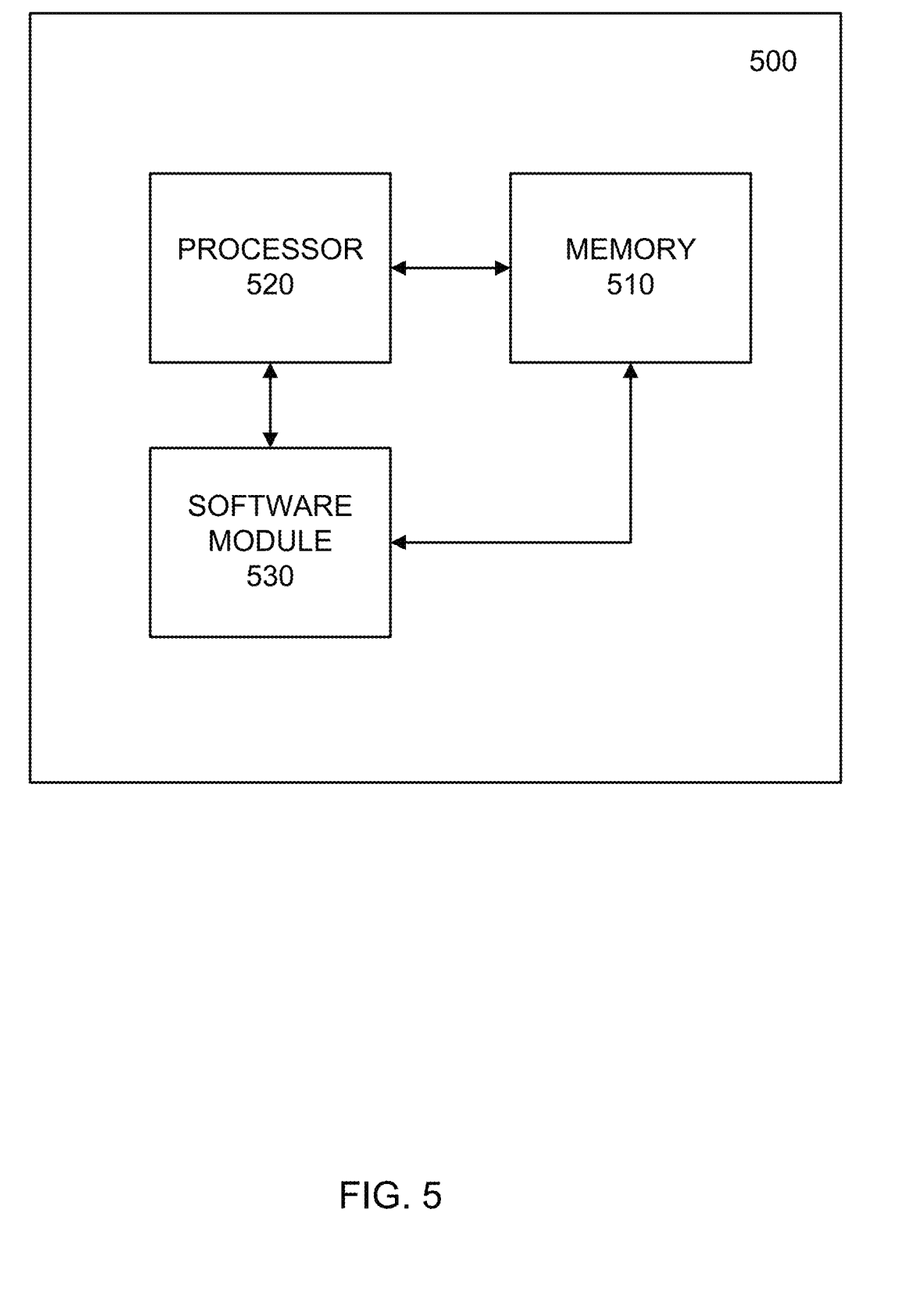
FIG. 5 illustrates an example network entity device configured to store instructions, software, and corresponding hardware for executing the same, according to example embodiments of the present application.

As illustrated in FIG. 5, a memory 510 and a processor 520 may be discrete components of the network entity 500 that are used to execute an application or set of operations. The application may be coded in software in a computer language understood by the processor 520, and stored in a computer readable medium, such as, the memory 510. The computer readable medium may be a non-transitory computer readable medium that includes tangible hardware components in addition to software stored in memory. Furthermore, a software module 530 may be another discrete entity that is part of the network entity 500, and which contains software instructions that may be executed by the processor 520. In addition to the above noted components of the network entity 500, the network entity 500 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   transmitting a test message from a first test site to a network site, wherein the test message is to solicit a feedback response message from the network site;
   determining that the feedback response message was not received by the first test site from the network site in response to the test message from the first test site;
   transmitting a new test message from a second test site to the network site based on the determining that the feedback response message was not received, wherein the new test message is to solicit the feedback response message from the network site;

determining whether the feedback response message was received from the network site in response to the new test message from the second test site; and determining whether the network site is in an up state or a down state based on the feedback response message being received or not being received in response to the new test message from the second test site.

2. The method of claim 1, wherein the test message is a ping sweep message.

3. The method of claim 1, further comprising:
transmitting another test message from the first test site to the second test site; and
determining whether the second test site is in an up state or a down state based on another feedback response message being received or not being received by the first test site.

4. The method of claim 1, further comprising:
determining the network site is in a down state based on the feedback response message not being received at the second test site from the network site.

5. The method of claim 1, further comprising:
receiving a new response feedback message from the network site at the another test site; and
determining the network site is in an up state based on the feedback response message being received at the second test site from the network site.

6. The method of claim 5, further comprising:
designating the network site to be in an up state only when both of the first test site and the second test site receive the feedback response message from the network site.

7. An apparatus, comprising:
a transmitter configured to:
transmit a test message from a test site to a network site, wherein the test message is to solicit a feedback response message from the network site; and
a processor configured to:
determine that the feedback response message was not received by the first test site from the network site in response to the test message from the first test site,
transmit a new test message from a second test site to the network site based on the determining that the feedback response message was not received, wherein the new test message is to solicit the feedback response message from the network site,
determine whether the feedback response message was received from the network site in response to the new test message from the second test site, and
determine whether the network site is in an up state or a down state based on the feedback response message being received or not being received in response to the new test message from the second test site.

8. The apparatus of claim 7, wherein the test message is a ping sweep message.

9. The apparatus of claim 7, wherein the transmitter is further configured to:
transmit another test message from the test site to the second test site, and the processor is further configured to:
determine whether the second test site is in an up state or a down state based on another feedback response message being received or not being received by the first test site.

10. The apparatus of claim 7, wherein the processor is further configured to:

determine the network site is in a down state based on the feedback response message not being received at the second test site from the network site.

11. The apparatus of claim 7, wherein the processor is further configured to:
determine the network site is in an up state based on the feedback response message being received at the second test site from the network site.

12. The apparatus of claim 11, wherein the processor is further configured to:
designate the network site to be in an up state only when both of the first test site and the second test site receive the feedback response message from the network site.

13. A non-transitory computer readable storage medium configured to store one or more instructions that when executed by a processor cause the processor to perform:
transmitting a test message from a first test site to a network site, wherein the test message is to solicit a feedback response message from the network site;
determining that the feedback response message was not received by the first test site from the network site in response to the test message from the first test site;
transmitting a new test message from a second test site to the network site based on the determining that the feedback response message was not received, wherein the new test message is to solicit the feedback response message from the network site;
determining whether the feedback response message was received from the network site in response to the new test message from the second test site; and
determining whether the network site is in an up state or a down state based on the feedback response message being received or not being received in response to the new test message from the second test site.

14. The non-transitory computer readable storage medium of claim 13, wherein the test message is a ping sweep message.

15. The non-transitory computer readable storage medium of claim 13, further configured to store one or more instructions that when executed by the processor cause the processor to perform:
transmitting another test message from the first test site to the second test site; and
determining whether the second test site is in an up state or a down state based on another feedback response message being received or not being received by the first test site.

16. The non-transitory computer readable storage medium of claim 13, further configured to store one or more instructions that when executed by the processor cause the processor to perform:
determining the network site is in a down state based on the feedback response message not being received at the second test site from the network site.

17. The non-transitory computer readable storage medium of claim 13, further configured to store one or more instructions that when executed by the processor cause the processor to perform:
receiving a new response feedback message from the network site at the another test site;
determining the network site is in an up state based on the feedback response message being received at the second test site from the network site; and
designating the network site to be in an up state only when both of the first test site and the second test site receive the feedback response message from the network site.

* * * * *